United States Patent [19]

Zievers

[11] 3,896,013
[45] July 22, 1975

[54] PROCESS FOR REMOVING METALLIC IONS FROM AN ELECTROLYTIC SOLUTION

[75] Inventor: James F. Zievers, LaGrange, Ill.

[73] Assignee: Industrial Filter and Pump Mfg. Co., Cicero, Ill.

[22] Filed: Feb. 25, 1974

[21] Appl. No.: 445,544

[52] U.S. Cl. ................................ 204/149; 204/130
[51] Int. Cl. ......... C02c 5/12; B01k 3/02; B01k 3/08
[58] Field of Search......... 204/149, 152, 130, 180 R

[56] References Cited
UNITED STATES PATENTS

| | | | |
|---|---|---|---|
| 887,666 | 5/1908 | Lester | 204/152 |
| 3,244,612 | 4/1966 | Murphy | 204/294 |
| 3,457,152 | 7/1969 | Maloney, Jr. et al. | 204/131 |
| 3,616,356 | 10/1971 | Roy | 204/152 |
| 3,692,661 | 9/1972 | Shockcor | 204/269 |

FOREIGN PATENTS OR APPLICATIONS

| 648,201 | 1/1951 | United Kingdom | 204/149 |
|---|---|---|---|

OTHER PUBLICATIONS
Johnson and Newman, "Desalting by Means of Porous Carbon Electrodes", Jrnl. Electrchem. Soc., March, 1971, Vol. 118, No. 3, pp. 510–517.

Primary Examiner—John H. Mack
Assistant Examiner—A. C. Prescott
Attorney, Agent, or Firm—Edmond T. Patnaude

[57] ABSTRACT

The present invention relates in general to a new and improved process and apparatus for removing metallic ions from an electrolytic solution, and it relates more particularly to a process and apparatus which may be used to economically purify an electrolytic solution containing only minute amounts of metallic ions. Those knowledgable in the metal plating art will readily understand the application of this process and apparatus for the final treatment of metal finishing waste fluids. As is explained more fully hereinafter, the process and apparatus of the present invention is also effective in removing organic compounds and phosphates from the electrolytic solution under treatment.

6 Claims, 2 Drawing Figures

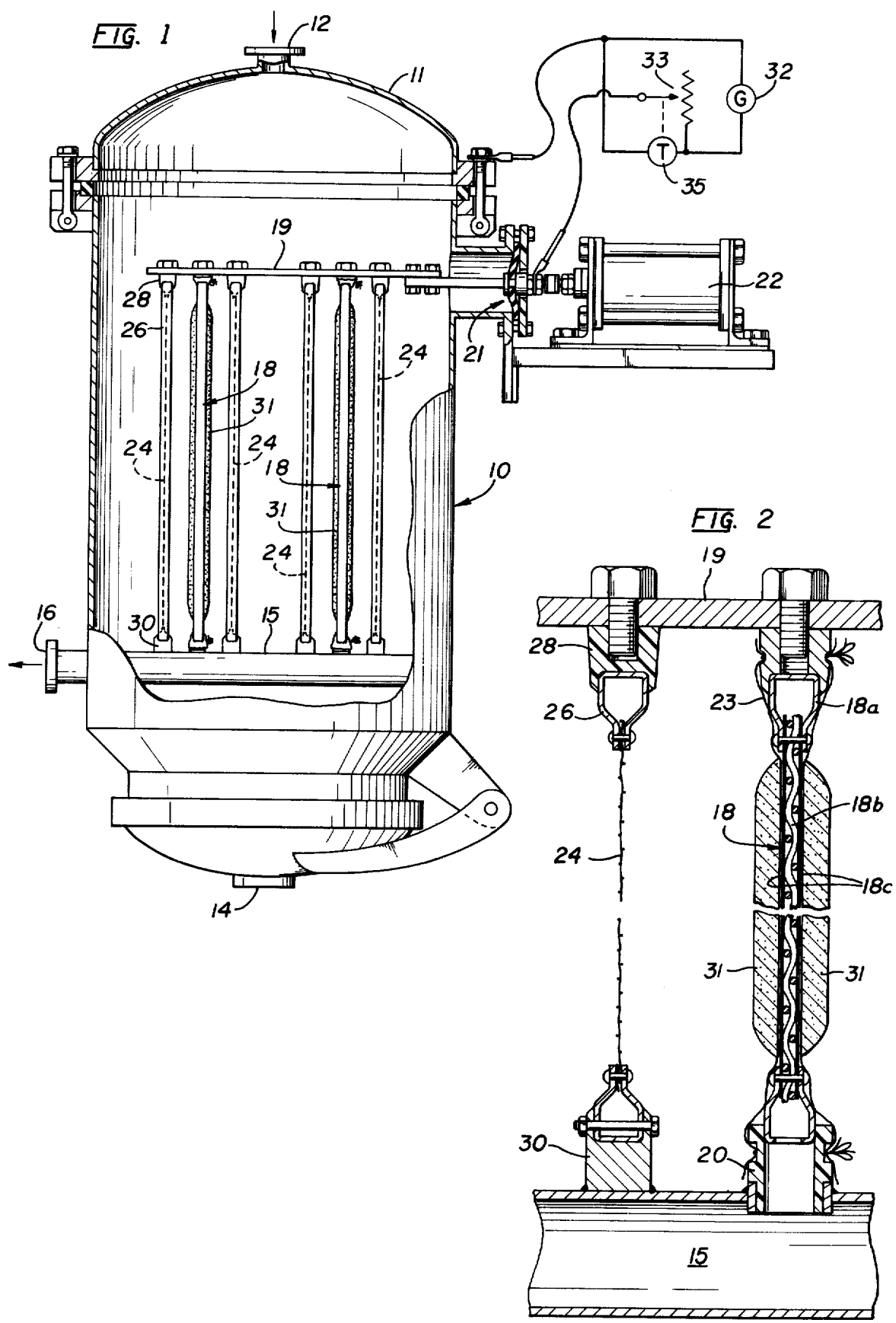

PROCESS FOR REMOVING METALLIC IONS FROM AN ELECTROLYTIC SOLUTION

BACKGROUND OF THE INVENTION

Purification of metal hydroxide solutions by means of electrolysis wherein the metallic ions are removed from the solution and deposited on a porous carbon electrode is described in U.S. Pat. No. 3,459,646. In that prior art system, the cathode is a porous block of carbon or graphite supported across a liquid flow path and through which the electrolytic solution to be treated is passed. An anode electrode is mounted in proximity to either the upstream or downstream side of the cathode to develop a steady DC electric field between the anode and cathode whereby to cause the metallic ions in the solution passing through the pores in the cathode to separate out of solution and be plated onto the interior surfaces of the carbon electrode. After the pores have become substantially plugged by the deposited ions it is necessary to interupt the operation and remove the metallic ions from the pores of the carbon electrodes by, for example, reversing the polarity of the system, chemically treating the carbon electrode with an acid solution or replacing the carbon electrode. The down time of the system is, therefore, substantial whereby two such systems would be required for each overall purifying system with which this process is to be employed.

Moreover, when this prior art electrolytic metal removal system is to be used in the metal plating industry to purify plating solutions prior to emission thereof to the local sewer system or nearby stream, it is still necessary to remove other objectionable materials from the plating effluent by other means. Such objectionable materials commonly found in such solutions are phosphates and organic molecules and compounds. Additional equipment is thus necessary for this additional purification.

SUMMARY OF THE INVENTION

Briefly, the process and apparatus of the present invention employs a porous cathode electrode made up of fine powder carbon particles held in the form of a porous cake on the upstream side of a perforate substrate by the pressure of the electrolytic solution being forced through the cake and the substrate. The cake is initially formed in much the same way a prefilt cake is deposited on a perforate filter element in a pressure filter, and as the electrolysis process is continued, additional powdered carbon is fed into the solution upstream of the cake whereby fresh carbon particles are added to the surface of the cake as the process proceeds. By using activated carbon, phosphates and organic molecules may also be separated from the solution and deposited on the interstitial surfaces of the powdered carbon cake simultaneously with the deposition of the metallic ions thereon. Periodically or whenever the cake is so thick as to impair the operation of the system, the system is shut down; the cake is physically removed from the substrate by any of the ways well known in the filter art for removing filter cake for filter leaves or tubes; another carbon cake is then deposited on the substrate; and the apparatus is thereafter returned on line. At the present time the low cost of powdered carbon makes it uneconomical to recover values from the used cake unless the metal removed from solution is particularly valuable. However, in such a case recovery is easily accomplished by heating the used carbon in a kiln to burn off the carbon, leaving the metal as a residue.

BRIEF DESCRIPTION OF THE DRAWING

Further objects and advantages and a better understanding of the present invention can be had by reference to the following detailed description, wherein;

FIG. 1 is a partially schematic, vertical cross-sectional view of metal ion removing apparatus embodying the present invention; and FIG. 2 is a cross-sectional view of a cathode leaf on which a carbon powder cake is deposited.

Referring to the drawing, a pressure tank 10 is provided with a removable cover 11 having an inlet port 12 therein, and a large bottom opening closed by a removable bottom cover 14. An outlet manifold 15 extends diametrically across the tank near the bottom and provides at one end the effluent outlet 16 outside the tank. The manifold 15 is welded to the tank 10 to hold it in position therein.

Mounted within the tank on the manifold 15 are a plurality of hollow pressure leaves 18 having perforate facial surfaces and having internal recesses communicating with the outlet manifold 15 through tubular connections 20 at the bottom. The leafs 18 include a metal frame 18a, a course wire grid 18b and wire screens 18c rivetted to the frame. A fabric bag 23 overlies the frame and screens and is suitably tied to the connectors at the top and bottom. Extending across the tops of the leaves 18 is a metal bar 19 which is secured as by bolts or other suitable means to the leaves 18. The bar 19 extends through an electric insulator and pressure seal 21 to the outside of the tank where it is connected to an impactor type vibrator 22. As explained more fully hereinafter, the metal leaf frame is at the same electric potential as the bar 19. The connectors 20 are suitable electric insulators wuch as plastic tubes whereby the leaves 18 are insulated from the tank 10.

A pluarality of wire mesh planar grids 24 are mounted between the bar 19 and the outlet manifold 15 in spaced parallel relationship to the faces of the leaves 18 as shown. The grids 24 are supported within metal frames 26 having essentially the same shape as the peripheral portions of the leaf frames. The grid frames are mounted to the bar 19 by insulating connectors 28 and to the manifold 15 by metal connectors 30. Accordingly the grids are at the same electric potential as the tank and the outlet manifold and thus at ground potential in a normal installation.

A source of DC voltage such as the illustrated DC generator 31 or other suitable source supplies a DC voltage for developing a DC electric field between the grids 24 and the leaves 18. The connectors to the generator are polarized such that the grids 24 are at a positive electric potential relative to the leaves 18. Preferably, the fine mesh woven fabric bag 23 is itself electrically conductive being woven, for example, of carbon filled filaments.

In operation, carbon powder is mixed with a liquid and supplied under pressure to the tank 10 through the inlet 12. The entrained carbon particles being larger than the interstices in the leaves 18 are deposited on the faces thereof in the form of porous carbon cakes 31 and the clarified liquid passes out of the filter via the effluent outlet manifold 15. During the initial buildup of the carbon cakes on the faces of the leaves 18 the liquid may be recirculated from the outlet 16 to the inlet while carbon powder is body fed into the recirculation line. After the cakes are thus built up to a sufficient minimum thickness of about three quarters of an inch; the generator 32 is energized whereby the grids 24 become anodes and the carbon cakes 31 become cathodes. The system is then placed on stream whereby the liquid from which the metal ions are to be removed enters the tank thru the inlet 12 and exits through the manifold 15. The metal ions are thus deposited on the exposed surfaces of the carbon particles in the same manner well known in the art of electrolytic ion removal. Moreover, by using steam activated carbon powder, organic compounds and phosphates contained in the liquid are adsorbed by the carbon particles in the cakes during the metal removal process.

In order to permit extended operating cycles, carbon powder is body fed to the liquid being purified before it enters the tank 12 whereby fresh carbon particles are deposited on the outer surfaces of the cakes. Since the distances between the anode screens and the carbon cakes thus decrease during the operating cycle, there is provided in accordance with another feature of the present invention, control means for varying the negative voltage on the leaves as the purification cycle proceeds. As shown for illustration purposes only, this control means employs a potentiometer 33 having a wiper 34 driven by a timer motor 35. During the metal removal operation the wiper is moved upwardly, as shown, thereby to gradually decrease the voltage between the carbon cakes and the anode screens as the cycle progresses.

There is thus provided a new and improved electrolytic process and apparatus for continually building up carbon electrodes during a metal ion removal operation. The invention is described in connection with generally planar surfaces on which the carbon cakes are built up but it will be understood by those skilled in the art that perforate tubes surrounded by hollow cylindrically shaped anodes may also be used to carry out the process of the present invention whereby the carbon electrodes will be hollow cylinders disposed within the cylindrical anodes.

What is claimed is:

1. A process for removing metal ions from a solution, comprising the steps of depositing a porous cake of carbon particles on a foraminous substrate by flowing a liquid in which said particles are entrained through said substrate, and passing said solution through said cake and said substrate while maintaining said cake at a negative electric potential relative to an anode immersed in said solution in spaced relationship to said cake, whereby said metal ions are deposited on the surfaces of said particles.

2. The process according to claim 1 comprising the further step of mixing carbon particles with said solution prior to the passage thereof through said cake to apply fresh carbon particles to said cake during the metal removal process.

3. The process according to claim 1 wherein said carbon particles are activated to remove other nonmetalic material from said solution.

4. The process according to claim 3 wherein said carbon particles are steam activated.

5. The process according to claim 1 comprising the further step of replacing said cake by interrupting the flow of said solution through said cake, removing said cake from said substrate, and then depositing a cake of fresh carbon particles on said substrate.

6. The process according to claim 1 wherein said particles are carbon powder.

* * * * *